US007607597B2

(12) United States Patent
Linn et al.

(10) Patent No.: US 7,607,597 B2
(45) Date of Patent: Oct. 27, 2009

(54) MEAT PROCESSING MACHINE COMPRISING A FAT ANALYSING DEVICE

(76) Inventors: Stefan Linn, Austraβe 9, D-65594 Runkel (DE); Willi Eschenröder, Reckenbergstraβe 20, D-35216 Biedenkopf-Wallau (DE); Dieter Evers, Hubertusstr. 14, D-75334 Straubenhardt (DE)

( * ) Notice: Subject to any disclaimer, the term of this patent is extended or adjusted under 35 U.S.C. 154(b) by 688 days.

(21) Appl. No.: 10/476,944

(22) PCT Filed: May 7, 2002

(86) PCT No.: PCT/EP02/05022

§ 371 (c)(1),
(2), (4) Date: Apr. 8, 2004

(87) PCT Pub. No.: WO02/089590

PCT Pub. Date: Nov. 14, 2002

(65) Prior Publication Data

US 2004/0149841 A1    Aug. 5, 2004

(30) Foreign Application Priority Data

May 7, 2001  (DE)  ................................ 101 22 014

(51) Int. Cl.
*B02C 18/30* (2006.01)
(52) U.S. Cl. ...................... 241/30; 241/82.5; 241/101.2
(58) Field of Classification Search ................. 452/150, 452/158; 241/82.1–82.7, 101.2, 30, 25
See application file for complete search history.

(56) References Cited

U.S. PATENT DOCUMENTS

| 3,735,247 | A | 5/1973 | Harker | ......................... 324/34 |
| 4,171,164 | A | 10/1979 | Groves | ......................... 366/152 |
| 4,429,836 | A | 2/1984 | Goransson | ............... 241/282.1 |
| 5,324,228 | A | 6/1994 | Vogeley, Jr. | ................. 452/158 |
| 5,858,795 | A | 1/1999 | Banayan | ....................... 436/71 |

FOREIGN PATENT DOCUMENTS

| DE | 298 600 | 10/1983 |
| DE | 690 28 350 | 6/1990 |
| DE | 19846876 | 10/1998 |
| WO | WO 95/28088 | 10/1995 |

*Primary Examiner*—Mark Rosenbaum
(74) *Attorney, Agent, or Firm*—Perman & Green LLP

(57) ABSTRACT

The invention relates to a meat processing machine which is used for mincing, filling, degassing and/or mixing fresh and/or frozen meat. Said machine also comprises a fat analysing device (7, 8) for determining the fat content in said meat.

18 Claims, 8 Drawing Sheets

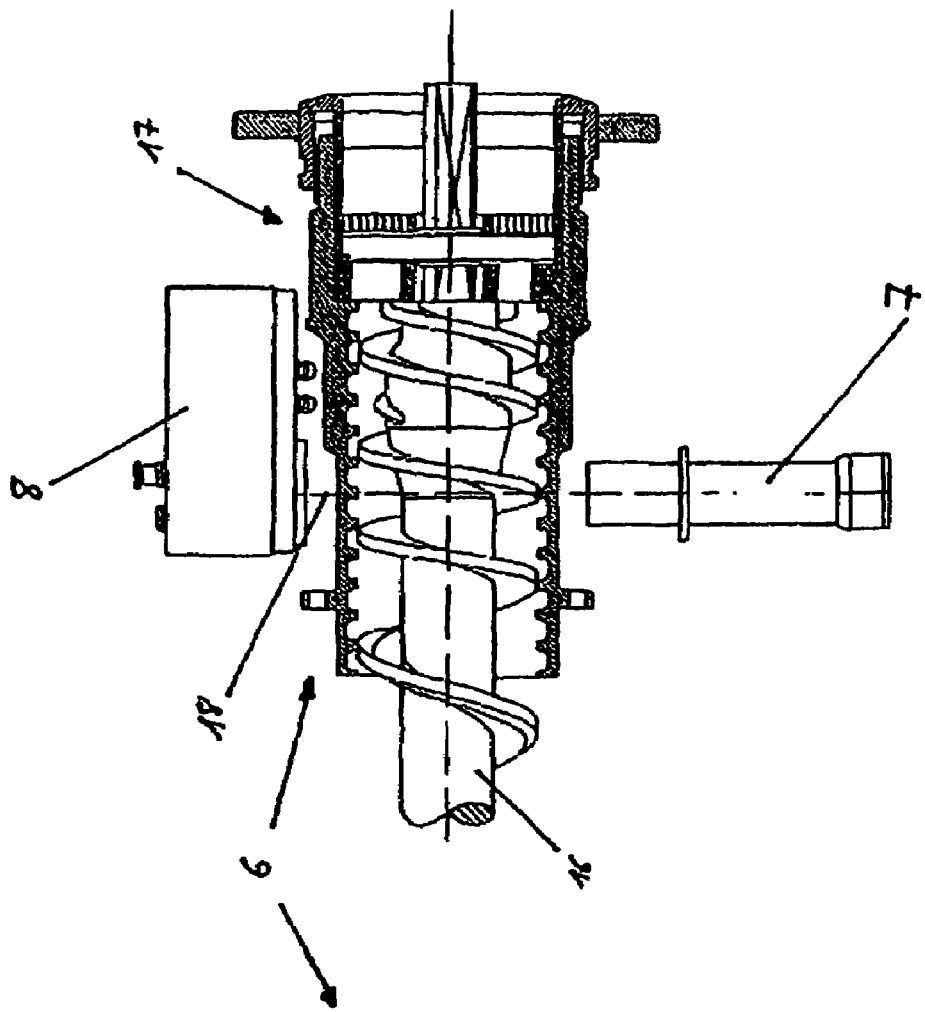
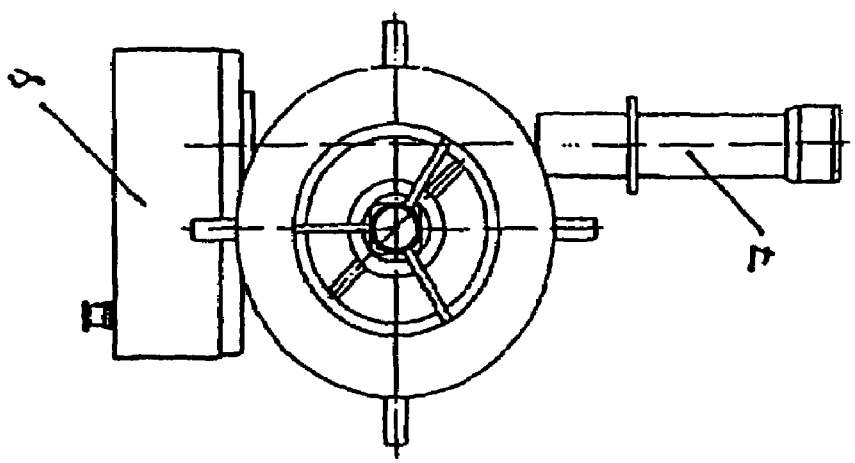
FIG. 5B
FIG. 5A

MEAT PROCESSING MACHINE COMPRISING A FAT ANALYSING DEVICE

This application claims the benefit of the earlier filed International Application No. PCT/EP02/05022, International Filing Date, May 7, 2002, which designated the United States of America, and which international application was published under PCT Article 21(2) as WO Publication No. WO 02/089590.

The present invention relates to a meat processing machine which is used for mincing, filling, degassing and/or mixing fresh and/or frozen meat and comprising a fat analysing device for the determination of the fat content in the meat.

Since meat products must not exceed a specific fat content, the precise fat analysis of meat and the exact establishment of specific fat contents are increasingly important. The analysis of the fat content of meat is currently frequently performed discontinuously by means of the removal of a sample of meat from a mixer or a conveyor belt and its subsequent analysis in a laboratory. Sometimes, the fat analysis is already performed continuously; for example, the fat content of meat on a conveyor belt is determined with a sensor. However, the drawback of these measurements is that the mass throughput of the meat must be absolutely constant and the measurement is performed in a tube, which is usually not acceptable to the meat-processing industry because the meat is smeared during this measurement. In addition, with this method the fat analysis is impossible or only restrictedly possible with frozen meat.

Therefore, the object is to provide a device and a method for the continuous determination of the fat content of meat without the drawbacks of the prior art.

According to the invention, the object is achieved by means of a meat processing machine which may be used for mincing, filling, degassing and/or mixing fresh and/or frozen meat and which comprises a fat analysing device for the determination of the fat content in the meat.

A person skilled in the art was extremely surprised to learn that it is possible to integrate a fat analysing device in one meat processing machine. The devices according to the invention have the advantage that meat processing and fat analysis are performed in one device. There are clearly defined measuring conditions. The determination of the meat volumetric throughput and/or meat mass throughput in the meat processing machine is very simple and the fat analysis and the determination of the meat volumetric throughput and/or meat mass throughput in the device according to the invention is very precise.

According to the invention, the fat analysing device is integrated in the meat processing machine. For the purposes of the invention, a meat processing machine is any meat processing machine known to a person skilled in the art with which meat may be minced, filled, degassed and/or filled. Preferably, however, the meat processing machine is a mixer, a filling machine or a mincing machine, in particular a mincer/grinder.

The fat analysing means may be any fat analysing means familiar to a person skilled in the art. However, preferably the fat analysing means comprises a radiation source with preferably several energy levels and a radiation detector. In a quite particularly preferred embodiment, the radiation source is an X-ray source and the radiation detector is an X-ray detector. Also preferred are an infrared source as the radiation source and an infrared detector as the radiation detector.

During fat analysis by means of an X-ray detector, the attenuation of the X-ray is preferably measured in an energy range of between 18 and 45 keV. Preferably, the distance between the X-ray source and the X-ray detector is 20 to 300 mm, particularly preferably 50 to 100 mm. The calculation of the fat content and the control of the X-ray source is performed by a microprocessor or stored program control (SPC).

Also preferably, the fat analysis is performed with Near Infrared Reflection (NIR) or Near Infrared Transmission (NIT).

The fat analysis may be performed at any point in the meat processing machine at which the measuring path is at least at times not interrupted by moving parts, in particular metal parts.

Often the meat processing machines have conveying units, for example conveying screws, and a mincing unit whereby the conveying unit presses the meat through the mincing unit. The fat analysis is then preferably performed in the area of the conveying unit whereby with this combination particular care should be taken to ensure that the measuring path is at least at times not interrupted by moving parts, in particular metal parts. Also preferably, the fat analysis may also be performed in an area between the conveying unit and mincing unit. Also preferably, the fat analysis is performed in the mincing area or the area following the mincing. These preferred embodiments have the advantage that the meat volumetric throughput may be determined by a simple speed measurement.

In a preferred embodiment, the mincing unit has at least one preliminary cutter and/or at least one perforated disk. In this case, the measurement is preferably performed in the area of the preliminary cutter and/or perforated disk. A perforated disk of this type or a preliminary cutter of this type has recesses and the measuring path is then arranged in a recess of this type for example.

The measurement of the fat content may be performed at any point in the meat processing machine. Preferably, however, the measurement is performed at a point at which the meat is already slightly compacted. Particularly preferably, the overpressure at the measurement point is at least 0.5 bar, quite particularly preferably at least 1 bar.

In another preferred embodiment of the invention, the pieces of meat at the time of the measurement have a maximum edge length of 80 mm, preferably maximum 60 mm.

Preferably, the meat processing machine according to the invention also comprises a speed measuring device so that in addition to the fat content it is also possible to determine the volumetric throughput of the meat. The measurement of the volumetric throughput in the meat processing machine according to the invention is advantageously performed in such a way that gaps between the pieces of meat may be identified and ignored.

Quite preferably preferred, the fat analysing device will simultaneously also determine the density of the meat or its weight per unit area so that it is possible to determine not only the volumetric throughput but also the mass throughput of the meat.

In a preferred embodiment of the method according to the invention, the values for the fat content and the mass throughputs of the meat are determined over a period of from 1 to 10, preferably 2 to 4 seconds.

Preferably, both the fat concentrations in question and the associated mass throughputs are sent to a central control unit which stores and analyses the measured values in question and uses them to calculate average fat contents, for example in mixers or in specific products.

Preferably, the average fat content of the meat in the mixer is calculated in accordance with the following formula:

$$\frac{(\text{Fat content \% 1.weight 1} + \text{fat content \% 2.weight 2} + \ldots + \text{fat content \% } n.\text{weight } n)}{\sum_{i=1}^{n} \text{weight}(n)}$$

Another object of the invention is a method for the determination of the fat content in a meat processing machine during processing.

This method has the advantage that the analysis of the fat content does not cause any time delay. No additional devices have to be provided to determine the fat content of the meat. The fat content may be determined in both fresh and frozen meat. The fat analysis will not damage the meat.

Preferably, the fat analysis is performed during the mincing, mixing and/or filling, preferably with X-rays, NIR and/or NIT.

In a preferred embodiment of the invention, in addition to the fat content of the meat, its density or mass per unit area and its conveying speed in the processing machine are also determined.

The invention will be further described with reference to FIGS. 1-8. These explanations are examples only and do not restrict the general inventive concept.

FIGS. 5A-5B show a fat analysing device in the area of the conveying organ.

Figure 1A:
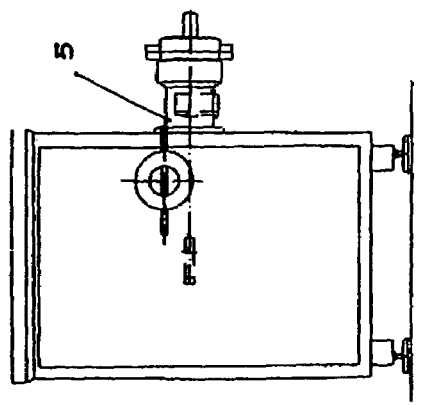
FIGS. 1A-1C show an angled mincer/grinder with a fat analysing device.
Figure 1B:
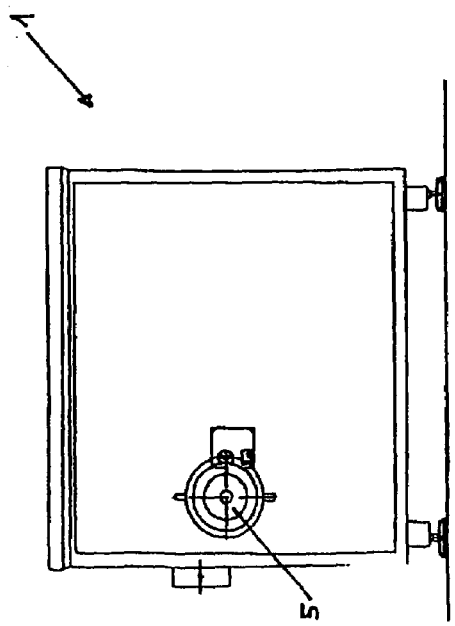
Figure 1C:
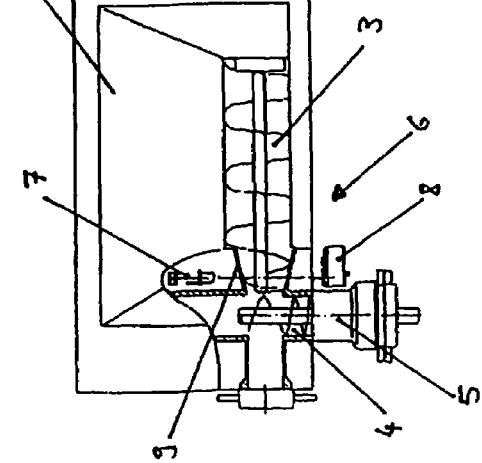

FIGS. 1A-1C show an angled mincer/grinder 1 in three views. Fresh or frozen meat is poured into the hopper 2 and conveyed by means of the first and second screw 3, 4 to the cutting set 5 in which the meat is minced. The fat analysing device 6 is arranged in the area of the first screw 3 and comprises a radiation source 7 and a radiation detector 8. In the present case, the fat analysing device is based on X-rays. A person skilled in the art will realise that other measuring methods could also be used. In the case of fat analysing devices in the vicinity of moving parts, it is important that the measuring path is not interrupted at the time of the measurement or if the measuring path should be interrupted at the time of the measurement, that these measurements are discarded. The fat analysing device is arranged in the area of the first screw in such a way to ensure that all meat used to fill the mincer/grinder passes through the fat analysing device. The narrowing of the cross section of the housing 9 of the screw 3 also ensures that the meat is already slightly compacted so that the meat flow has very few or no gaps. A simple speed measurement (not shown) determines the speed at which the meat is conveyed in the area of the fat analysis and hence the volumetric throughput of the meat. The fat analysing device simultaneously determines the density of the volumetric throughput of the meat and thereby determines the mass throughput of the meat. A person skilled in the art will realise that the fat analysing device could also be arranged in the area of the screw 4, the cutting device 5, between the devices 4, 5 or downstream of device 5. In addition, the fat analysing device may also be arranged in the area of the hopper 2.

Figure 2:
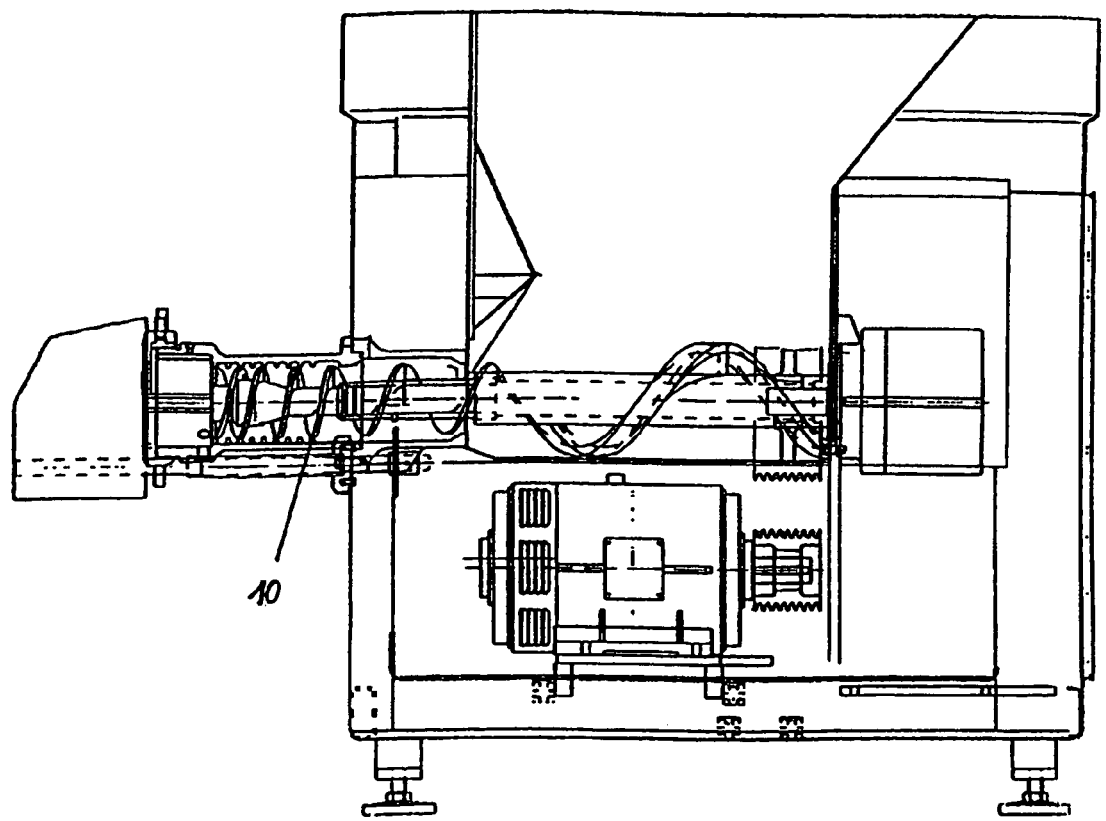
FIG. 2 shows a single-screw mincer/grinder.

FIG. 2 shows a single-screw mincer/grinder. The screw 10 conveys the meat through a cutting set (not shown) in which the meat is minced. The fat analysing device (not shown) may be arranged in the area of the screw 10 or downstream of this based on the material flow direction. However, according to the invention, it is important for the measuring device to be a part of the single-screw mincer/grinder. In addition, the fat analysing device may also be arranged in the area of the feed hopper.

Figure 3:
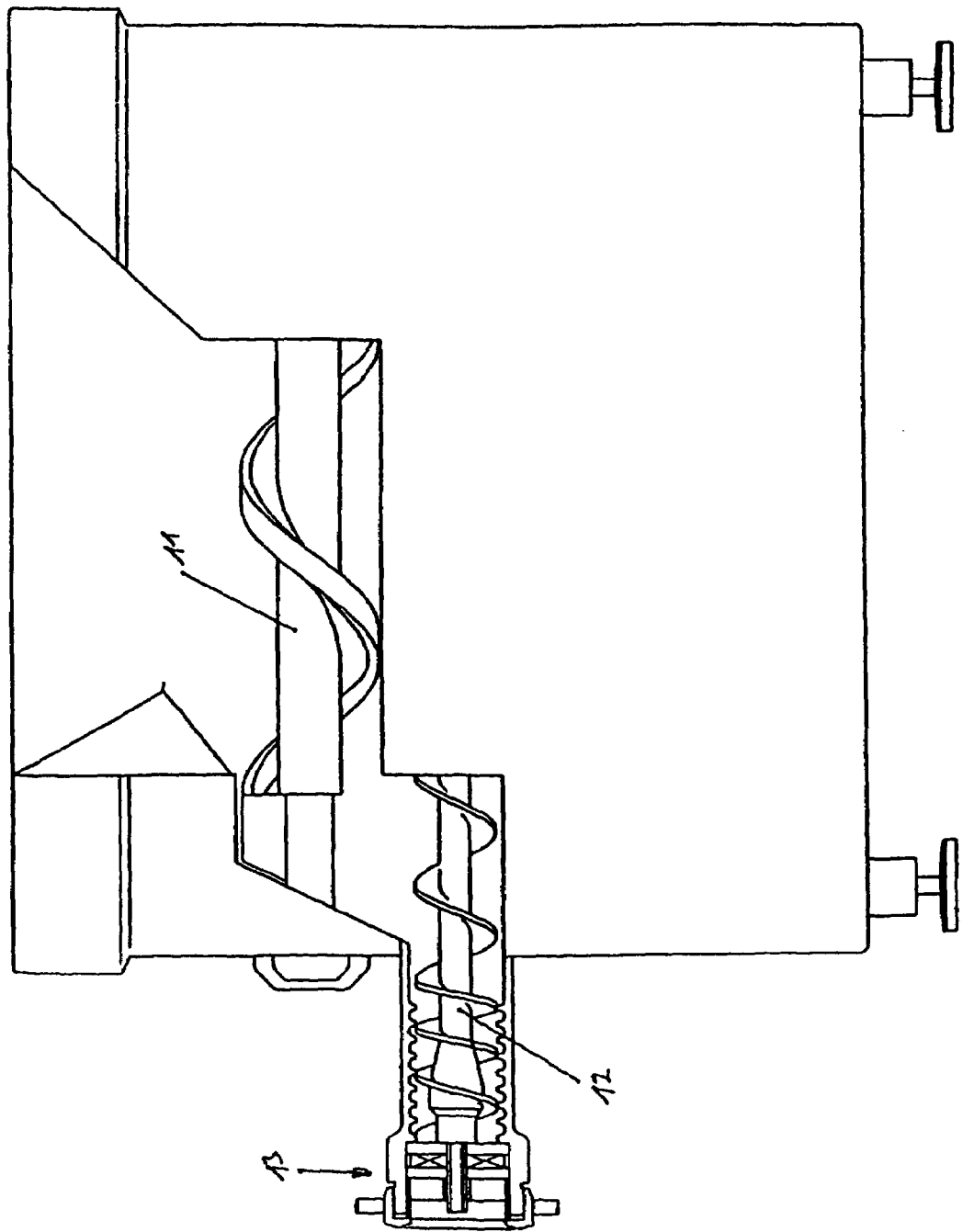
FIG. 3 shows a mincer/grinder with two offset screws.

FIG. 3 shows a mincer/grinder with two offset screws 11, 12. The screws 11, 12 convey the meat through a cutting set 13 in which the meat is minced. The fat analysing device (not shown) may be arranged in the area of the screws 11, 12 or downstream thereof based on the material flow direction. However, according to the invention, it is important for the measuring device to be a part of the single-screw mincer/grinder. In addition, the fat analysing device may also be arranged in the area of the feed hopper.

Figure 4:
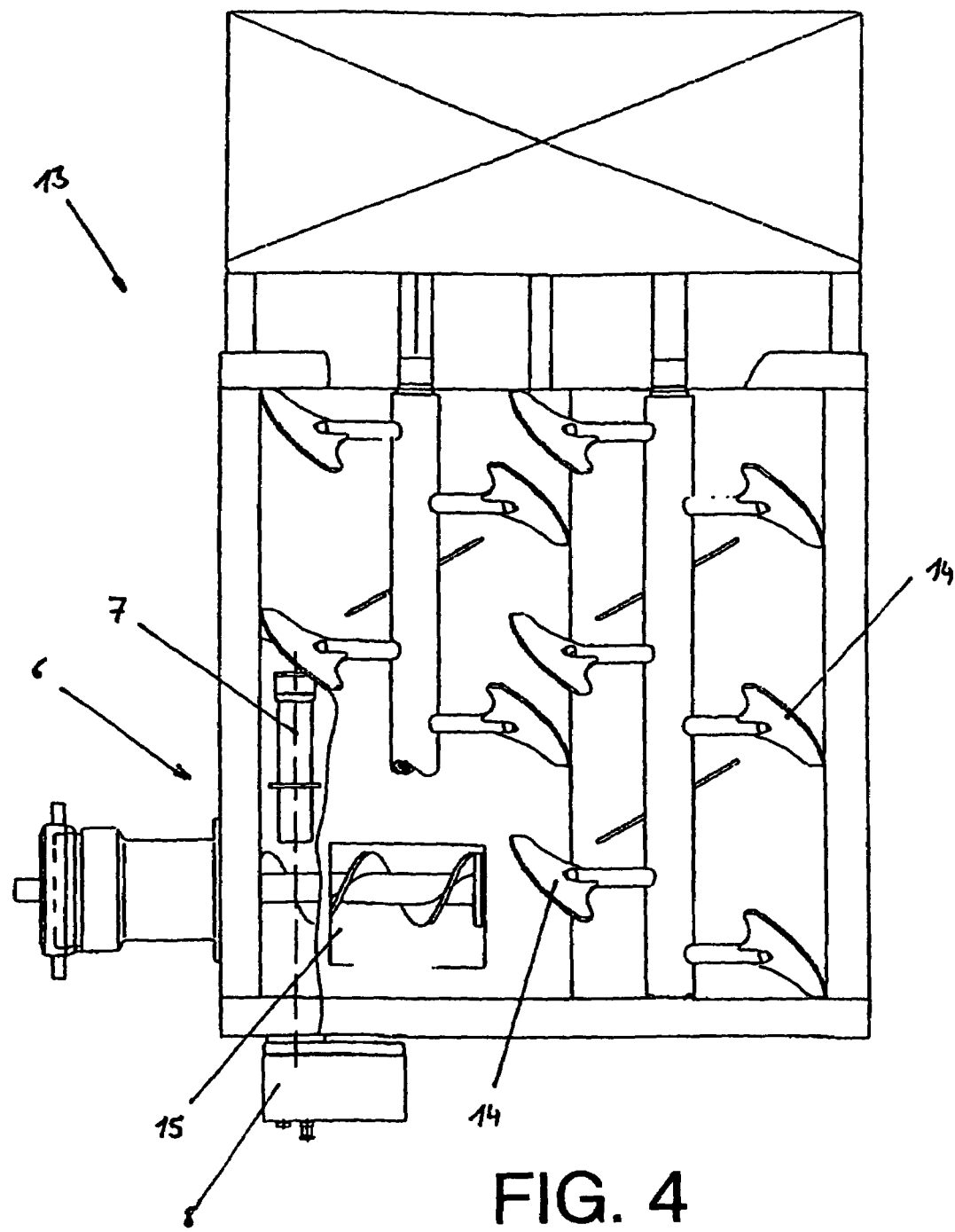
FIG. 4 shows a mixer with an attached mincing device with a fat analysing device.

FIG. 4 shows a mixer 13 with a plurality of mixing organs 14 and a discharge screw 15 by means of which the mixed meat is conveyed out of the mixer. There may also be a cutting device (not shown) downstream of the discharge screw. The fat analysing device 6 is arranged in the area of the screw 15 and comprises a radiation source 7 and a radiation detector 8. In this case, the fat analysing device is based on X-rays. A person skilled in the art will realise that other measuring methods could also be used. In the case of fat analysing devices in the vicinity of moving parts, it is important that the measuring path is not interrupted at the time of the measurement or if the measuring path should be interrupted at the time of the measurement, that these measurements are discarded. The fat analysing device is arranged in the area of the screw in such a way to ensure that all meat leaving the mixer passes through the fat analysing device. At the time of the measurement, the meat is already slightly compacted so that the meat flow has very few or no gaps. A simple speed measurement (not shown) determines the speed at which the meat is conveyed in the area of the fat analysis and hence the volumetric throughput of the meat. The fat analysing device simultaneously determines the density of the volumetric throughput of the meat and thereby determines the mass throughput of the meat. A person skilled in the art will realise that the fat analysing device could also be arranged in other areas of the mixer.

FIGS. 5A-5B show 5 a fat analysing device 6 in the area of a screw 16, for example a mincer/grinder. The screw 16 conveys the meat through a cutting set 17. The fat analysing device 6 comprises a radiation source 7 and a radiation detector 8. The measuring beam is indicated by the dashed line 18. In this case, the fat analysing device is based on X-rays. A person skilled in the art will realise that other measuring methods could be used. In the case of fat analysing devices in the vicinity of moving parts, it is important that the measuring path is not interrupted at the time of the measurement or if the measuring path should be interrupted at the time of measurement, that these measurements are discarded.

Figure 6B:
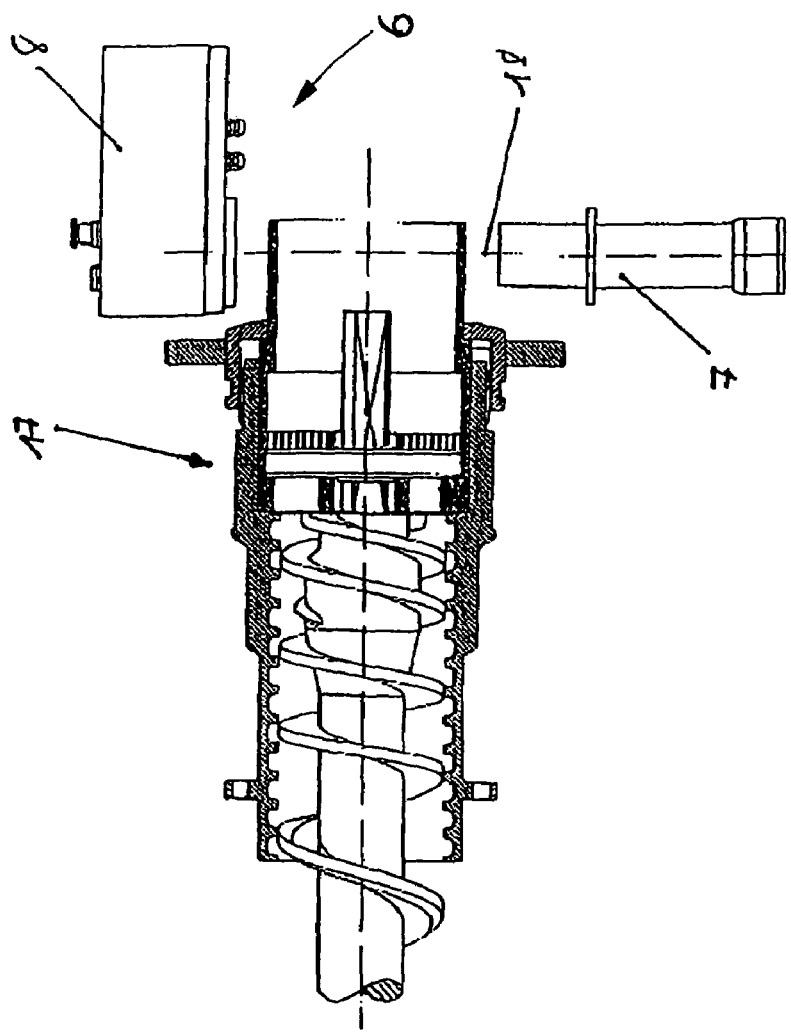
FIGS. 6A-6B show fat analysing device downstream of the mincing device.
Figure 6A:
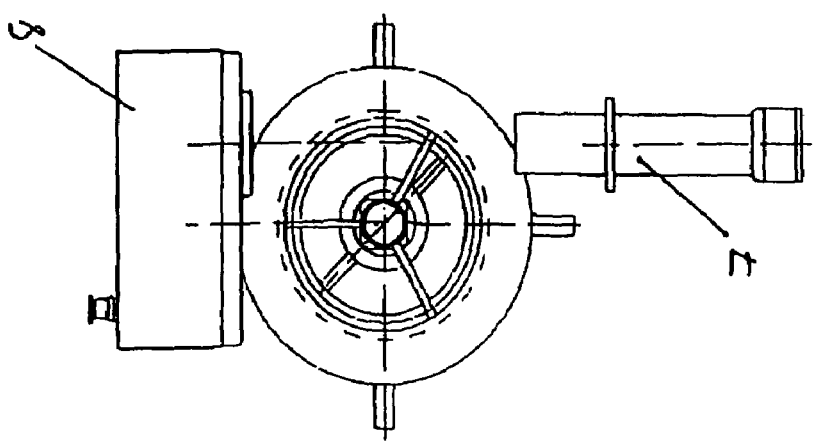

FIGS. 6A-6B show a fat analysing device which is downstream of the cutting device 17 shown in FIGS. 5A-5B. However, it is essential for the invention that the measuring device 6 is still part of the meat processing machine. Otherwise, reference is made to the explanations for FIGS. 5A-5B.

Figure 7B:
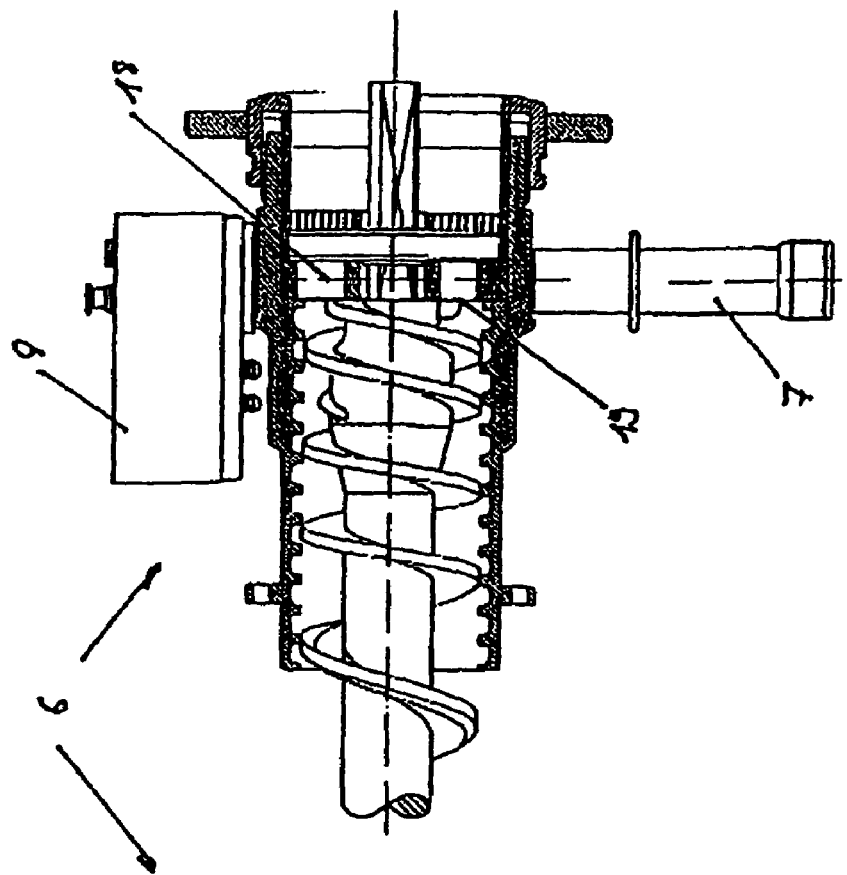
FIGS. 7A-7B show 7 a fat analysing device in the area of the mincing device.
Figure 7A:
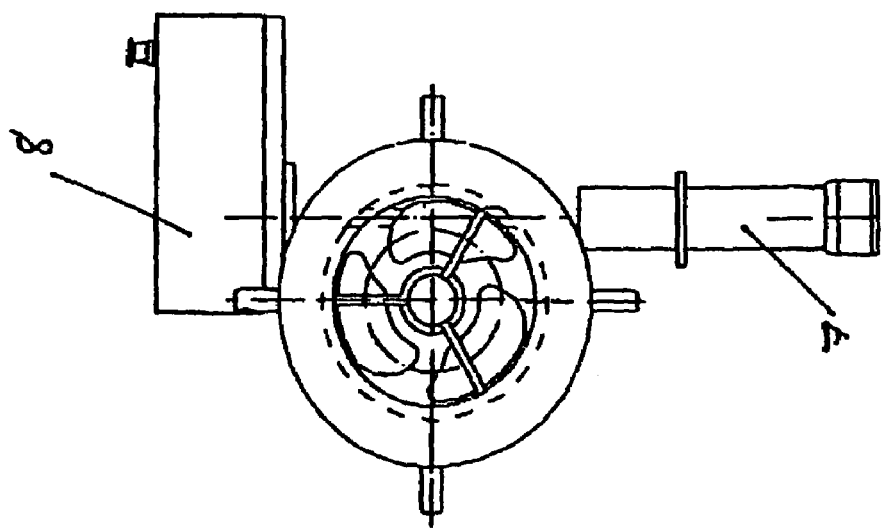

FIGS. 7A-7B show a fat analysing device 6 in the area of the mincing device 17. The mincing device comprises among other things a preliminary cutter 19 in the area of which the measuring device is arranged. Otherwise reference is made to the explanations for FIGS. 5A-5B and 6A-6B.

Figure 8:
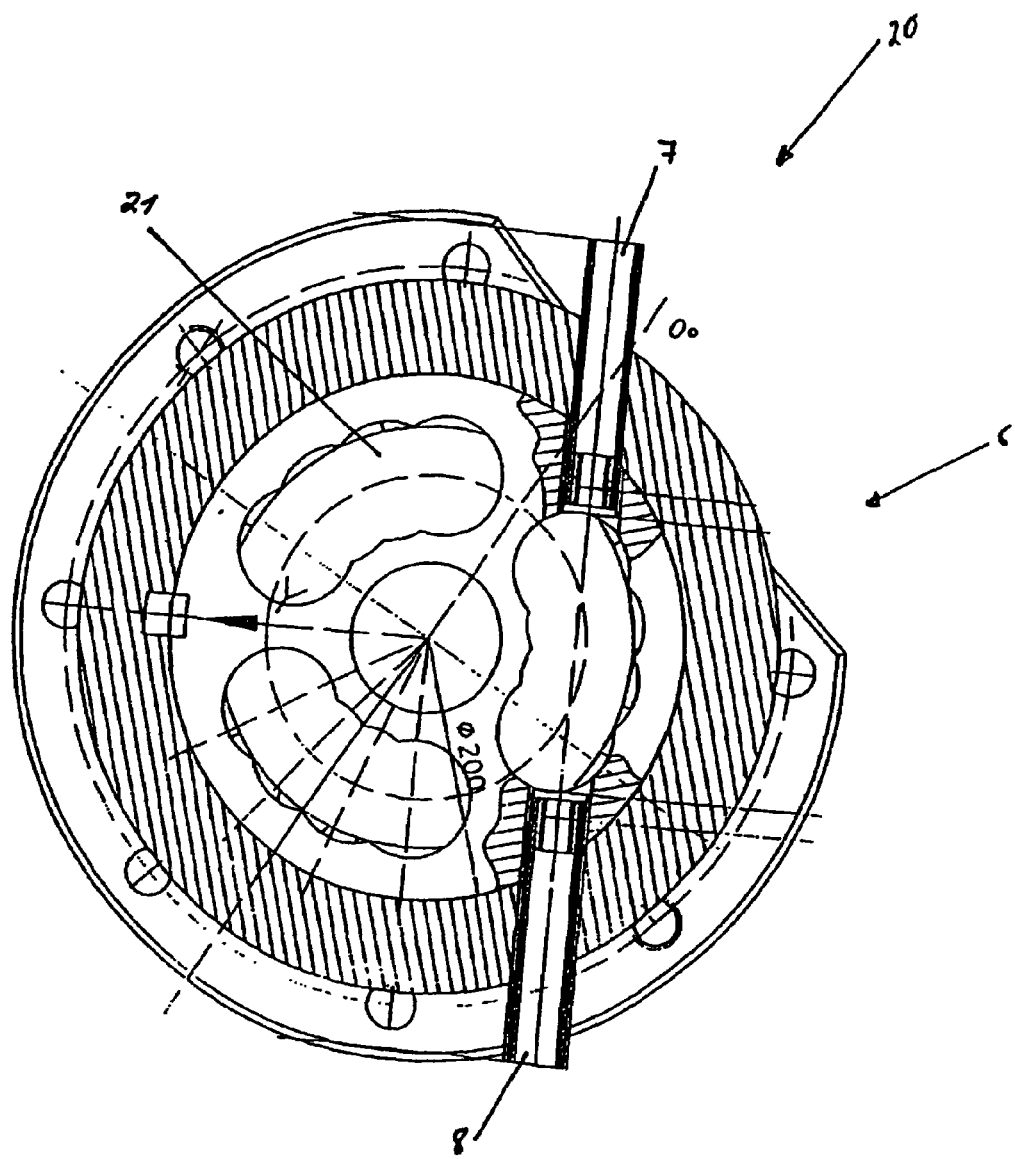
FIG. 8 shows a fat analysing device in the area of the preliminary cutter.

FIG. 8 shows another fat analysing device in the area of a preliminary cutter 20. The preliminary cutter comprises three or more recesses 21 through which the meat is pressed. Arranged in these recesses is the fat analysing device 6 comprising a radiation source 7 and a radiation detector 8. Since the meat is pressed through very narrow recesses with a clearly defined cross section, it is easy to determine the volumetric throughput or mass throughput. In this case, the measuring path is again not intersected by moving parts. This embodiment of the meat processing machine according to the invention is particularly compact and very simple to implement.

The invention claimed is:

1. Meat processing machine comprising:
a fat analysing device for the determination of the fat content in the meat in a subregion of the meat processing machine, the fat analysing device comprising a radiation source and a radiation detector, the fat analysing device being integrated in the meat processing machine in the area of one or more of a mincing unit, a screw conveyor of a conveyor unit, a filling unit and a mixer;
a measuring path, located in the subregion, from the radiation source to the radiation detector, the measuring path being uninterrupted by moving metal parts; and
wherein the meat processing machine is used for mincing, filling, degassing and/or mixing fresh meat and/or frozen meat.

2. Meat processing machine according to claim 1, characterised in that it is a mixer or a filling machine.

3. Meat processing machine according to claim 1, characterised in that it is a mincing machine.

4. Meat processing machine according to claim 1, characterised in that the fat analysing device is based on X-rays, NIR and/or NIT.

5. Meat processing machine according to claim 3, characterised in that it comprises at least one conveying unit and at least one mincing unit, whereby the conveying unit presses the meat through the mincing unit.

6. Meat processing machine according to claim 5, characterised in that the fat measurement is performed in the area of the conveying unit or between the conveying unit and the mincing unit.

7. Meat processing machine according to claim 5, characterised in that the fat measurement is performed in the area of the mincing unit or downstream of the mincing unit.

8. Meat processing machine according to claim 7, characterised in that the mincing unit comprises at least one preliminary cutter and/or one perforated disk and that the measurement is performed in the area of the preliminary cutter and/or the perforated disk.

9. Meat processing machine according to claim 8, characterised in that the preliminary cutter or the perforated disk comprises at least one recess and the measuring path is arranged in the recess.

10. Meat processing machine according to claim 1, characterised in that the determination of the fat content is performed with a pressure in the meat of at least 0.5 bar.

11. Meat processing machine according to claim 1, characterised in that the largest dimension of the pieces of meat to be processed is maximum 80 mm.

12. Meat processing machine according to claim 1, characterised in that it also has a speed measuring device and/or volumetric throughput measuring device.

13. Meat processing machine according to claim 12, characterised in that during the volumetric throughput measurement, gaps between the pieces of meat are ignored.

14. Meat processing machine according to claim 1, characterised in that the fat analysing device also determines the density of the meat or its weight per unit area.

15. Method for determining the fat content in fresh meat or frozen meat, wherein the fat content is determined in a meat processing machine during processing, wherein a fat analysing device is integrated in the meat processing machine in the area of one or more of a mincing unit, a screw conveyor of a conveyor unit, a filling unit and a mixer, the method comprising emitting a radiation by a radiation source and detecting the radiation with a radiation detector, the determination of the fat content in the meat being performed in a subregion of the meat processing machine in which a measuring path from the radiation source to the radiation detector is at least at times not interrupted by moving metal parts.

16. Method according to claim 15, characterised in that the processing is mincing, mixing and/or filling.

17. Method according to claim 15, characterised in that the measurement is performed with X-rays, NIR and/or NIT.

18. Method according to claim 15, characterised in that the speed, the density and/or the volumetric throughput of the meat being processed is measured.

* * * * *